United States Patent Office 3,361,553
Patented Jan. 2, 1968

3,361,553
METHOD OF DESUCKERING TOBACCO PLANTS WITH OZO-, HYDRAZO-, AND AZOXY-BENZENES
Johannes Van Overbeek, Modesto, Calif., assignor to Shell Oil Company, New York, N.Y., a corporation of Delaware
No Drawing. Filed June 22, 1964, Ser. No. 377,108
10 Claims. (Cl. 71—78)

ABSTRACT OF THE DISCLOSURE

Method of inhibiting axillary bud growth of decapitated tobacco plants by contacting the undeveloped axillary buds with a hydrazobenzene, an azobenzene or an azoxybenzene.

---

This invention relates to control of the growth of buds on tobacco plants. More particularly, this invention relates to the inhibition of bud growth on tobacco plants following the deflowering of the plants.

In the growth of tobacco plants, there first develop the large leaves that form the commercial crop, then as the season progresses the plant develops apical flower buds. The large leaves then are not ready for harvest. As the flower buds develop, nutrients are withdrawn from the leaves, so that if the buds are allowed to grow, the leaves lose much of their nutrient content, do not realize their full growth and become unmarketable. Consequently, it is customary to "decapitate" the tobacco plant—that is, soon after the flower buds begin to develop, to cut the stem below the flower buds. However, this does not solve the problem, for decapitation of the plant causes lateral (axillary) buds to develop rapidly, and if these are allowed to develop, they likewise remove nutrients from the large leaves, yet the leaves which develop from the lateral buds are too small to be marketable. These lateral growths (called suckers) can be removed by hand, and this will solve the problem, for no further growth will occur, but hand suckering is very expensive. Consequently, it has been customary for a number of years to spray the decapitated tobacco plants with maleic hydrazide, which effectively inhibits the development of the lateral buds. However, use of maleic hydrazide has caused serious problems, probably because it has a systemic effect upon the plant; firstly, it changes the shape of the large tobacco leaves from a rounded oval form to a much more narrow oval form, thus reducing the yield of leaf; and secondly, it has an adverse effect upon the quality of the tobacco products prepared from the leaf.

Accordingly, there is a real need for a chemical that will inhibit the development of laterial buds of decapitated tobacco plants without adversely affecting the marketable tobacco leaves.

It now has been found that compounds having the structural configuration

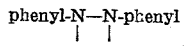

wherein the phenyl groups can be unsubstituted or substituted, and the indicated valence bonds of the nitrogen atoms can be bonded to hydrogen, or one to oxygen (as in the N-oxide), or together can form a second nitrogen-to-nitrogen link, as in the azobenzenes, are effective tobacco bud inhibitors, and do not otherwise affect the tobacco plant. When a compound of this kind is applied to the lateral bud, the growth of the bud is inhibited for a substantial period of time—up to several weeks—but the compound is not systemic and does not translocate. Other than inhibiting the bud development, the compounds of this kind that have been tested have had no other visible effect upon the plant. Such compounds appear to solve the problem of inhibiting bud growth of tobacco plants without introducing any undesirable side effects, and accordingly appear to be promising candidates for the commercial control of undesired tobacco bud growth.

Described in more detail, the effective compounds fall into two closely related classes, to wit:

(I) Compounds of the formula

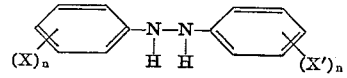

i.e., the hydrazobenzenes;

(II) Compounds of the formula

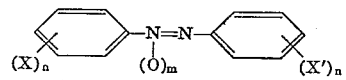

i.e., the azo- and azoxybenzenes, wherein X and X' represent middle halogen (chlorine or bromine), amino ($-NH_2$), mono- or dialkylamino wherein each alkyl group contains from 1 to 4 carbon atoms, nitro, alkyl of from 1 to 4 carbon atoms, mono- and poly-middle halogen-substituted alkyl of from 1 to 4 carbon atoms, cyano, alkoxy of 1 to 4 carbon atoms or hydroxy; $n=0$ to 5, $m=0$ to 1.

Typical examples of compounds of the invention include:

4-aminoazobenzene
4-chloroazobenzene
4-bromoazobenzene
2-bromo-2'-methylazobenzene
2-bromo-4-methylazobenzene
4-chloro-aminoazobenzene
2,4-diaminoazobenzene
4,4'-dinitroazobenzene
2-ethylazobenzene
4,4'-dihydroxyazobenzene
4-(chloromethyl)azobenzene
4,4'-dicyanoazobenzene
4,4'-cyanohydroxyazobenzene
4,4'-dicyanoazoxybenzene
4,4'-dinitroazoxybenzene The following examples are presented to illustrate how compounds of this invention may be employed to control sucker growth in tobacco plants. It should be emphasized that the presentation of these examples is in no way intended to limit the scope of the invention.

EXAMPLE I

Hydrazobenzene and azobenzene were applied to tobacco stems after manual topping. The chemicals were applied in a 50:50 water-acetone suspension containing 0.1% Tween 20 (Polyoxyethylene sorbitan monolaurate) as a wetting agent. The chemicals were applied with a small plastic wash-bottle to exposed apical ends of the stem by dripping down the solution, contacting the dormant buds in the leaf axils. The compounds were tested at 0.2% and 0.5% and the growth of the new shoots was measured in two ways. One month after application the weight of the leaves from the upper 5 buds was taken from each treatment and untreated controls (Table 1). As well, periodic new growth of the axillary buds was measured. These data are summarized in Table 2.

TABLE 1.—AVERAGE WEIGHT OF SUCKER GROWTH ONE MONTH AFTER TREATMENT

[5 upper buds of 5 plants per treatment]

| Compound | Conc. percent w. | Wt., Grams |
|---|---|---|
| Control | | 221 |
| Hydrazobenzene | 0.5 | 3 |
| Do | 0.2 | 20 |
| Azobenzene | 0.5 | 0 |
| Do | 0.2 | 9 |

TABLE 2.—AVERAGE LENGTH OF SUCKERS FROM DECAPITATED TOBACCO PLANTS

[5 upper buds of 5 plants per treatment]

| Compound | Conc. percent, w. | Avg. Length in cms. at Weeks After Treatment | | | |
|---|---|---|---|---|---|
| | | 1 | 2 | 3 | 4 |
| Control | | 3 | 9 | 15 | |
| Hydrazobenzene | 0.5 | 0 | 0 | 0.5 | 1.8 |
| Do | 0.2 | 0.5 | 2 | 5 | 11 |
| Azobenzene | 0.5 | 0 | 0 | 0 | 0.2 |
| Do | 0.2 | 0.2 | 0.5 | 1.5 | 5.5 |

EXAMPLE II

Hydrazobenzene was evaluated as a pour-on solution on field-growing tobacco plants. Fifty were treated at the rate of 10 milliliters of a 1% hydrazobenzene solution per plant. Two weeks later the sucker leaves were harvested, classed as to size and weighed. The results are summarized in Table 3.

TABLE 3.—EFFECT OF HYDRAZOBENZENE ON TOBACCO SUCKER GROWTH

| Treatment | Class suckers | Number/50 plants | Avg. wt. sucker, grams |
|---|---|---|---|
| Topped and hand suckered | Small | 159 | 7.58 |
| | Medium | 68 | 24.60 |
| | Large | 100 | 71.50 |
| Hydrazobenzene | Small | 39 | 10.15 |
| | Medium | 17 | 68.35 |
| | Large | 14 | 77.50 |

The overall reduction of sucker growth of the hydrazobenzene treatment compared to the hand suckering was calculated to be 74%.

Since the compounds of this invention are non-systemic, they should be applied locally to the individual tobacco plant. It is furthermore desirable to apply the compounds solely to the area where the axillary bud growth occurs. This can be accomplished by application to the uppermost portions of the stem by dribbling, pouring, dripping, brushing, squirting and similar methods which will prevent the excess material from wetting the large leaves. The alternate whorl growth of the tobacco plant lends itself to this type of application. The liquid applied tends to run down the stem reaching the leaf whorls where the axillary growth occurs and the desired inhibition is sought. The compounds can either be applied in the form of a solution or dispersion. Useful solutions for application can be prepared by using as the solvent any of the well-known inert horticultural carriers, including neutral hydrocarbons such as kerosene and other light mineral oil distillates of intermediate viscosity and volatility. Use of light "soluble" or emulsifiable oils such as those having a unsulfonated residue of at least 90% have been found to be satisfactory. Adjuvants, such as spreading or wetting agents, can be included in the solutions, representative materials of this character being fatty acid soaps, rosin, salts, saponins, gelatin, casein, long-chain fatty alcohols, alkyl aryl sulfonates, long-chain alkyl sulfonates, phenol-ethylene oxide condensates, $C_{12}$ and $C_{20}$ amines and ammonium salts, and the like. These solutions can be employed as such, or more preferably they can be dispersed or emulsified in water and the resulting aqueous dispersion or emulsion applied to the plants. If desired, the compounds of the present invention can be employed as aerosols, as by dispersing the same into the atmosphere by means of a compressed gas.

The concentration of the compounds of the invention to be used with the above carriers is dependent upon many factors, including the particular compound utilized, the carrier employed, the method and conditions of application.

The concentration of the compounds of the invention actually applied to plants will vary with the amount of solution or suspension applied, the variety and condition of growth of the plants. As little as 0.05 percent may be required and yet under certain conditions as much as 5% may be desired. The preferred range appears to be 0.2% to 1.0%.

I claim as my invention:

1. A method of inhibiting axillary bud growth of decapitated tobacco plants comprising contacting the undeveloped tobacco axillary buds with an axillary bud growth inhibiting amount of a compound of the formula

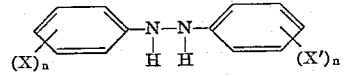

or

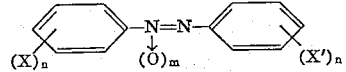

wherein each X and X′ is middle halogen, nitro, lower alkyl of 1–4 carbon atoms, mono- or poly-middle halogen-substituted alkyl of 1–4 carbon atoms, alkoxy of 1–4 carbon atoms, cyano, hydroxy, amino, ($-NH_2$) or mono- or dialkylamino wherein each alkyl group has from 1–4 carbon atoms; $n=0-5$ and $m=0-1$.

2. The method of claim 1 wherein said compound is in admixture with an inert horticultural diluent.

3. The method of claim 1 wherein the compound is

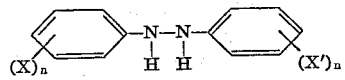

4. The method of claim 1 wherein the compound is

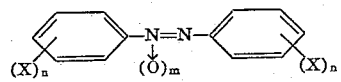

5. The method of claim 1 wherein the compound is hydrazobenzene.

6. The method of claim 1 wherein the compound is azobenzene.

7. The method of claim 1 wherein the compound is azoxybenzene.

8. The method of claim 5 wherein said hydrazobenzene is in admixture with an inert horticultural diluent.

9. The method of claim 6 wherein said azobenzene is in admixture with an inert horticultural diluent.

10. The method of claim 7 wherein said azoxybenzene is in admixture with an inert horticultural diluent.

References Cited

UNITED STATES PATENTS 2,645,636   7/1953   Sogn _____ 260—143

OTHER REFERENCES

Parups et al., cited in Chem. Abst. 56, 1789h (1962).

LEWIS GOTTS, *Primary Examiner.*

M. KASSENOFF, *Assistant Examiner.*